US009292141B2

(12) United States Patent
Zhong et al.

(10) Patent No.: US 9,292,141 B2
(45) Date of Patent: Mar. 22, 2016

(54) DOUBLE SIDED TOUCH SENSOR ON TRANSPARENT SUBSTRATE

(71) Applicant: Apple Inc., Cupertino, CA (US)

(72) Inventors: John Z. Zhong, Saratoga, CA (US); Sunggu Kang, San Jose, CA (US); James Edward Alexander Pedder, Sunnyvale, CA (US); Chun-Hao Tung, Luzhu Township (TW)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 14/067,810

(22) Filed: Oct. 30, 2013

(65) Prior Publication Data

US 2015/0116255 A1 Apr. 30, 2015

(51) Int. Cl.
*G06F 3/041* (2006.01)
*G06F 3/044* (2006.01)

(52) U.S. Cl.
CPC ................ *G06F 3/044* (2013.01); *G06F 3/041* (2013.01); *B32B 2457/208* (2013.01); *G06F 2203/04103* (2013.01)

(58) Field of Classification Search
CPC ............ G06F 3/041; G06F 3/044; G06F 1/16
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,009,153 | A | 12/1999 | Houghton et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,668,897 | B2 | 12/2003 | Gunn |
| 6,690,387 | B2 | 2/2004 | Zimmerman et al. |
| 7,010,333 | B2 | 3/2006 | Trively |
| 7,015,894 | B2 | 3/2006 | Morohoshi |

(Continued)

FOREIGN PATENT DOCUMENTS

| | | |
|---|---|---|
| CN | 1479891 A | 3/2004 |
| GB | 2 299 394 A | 10/1996 |

(Continued)

OTHER PUBLICATIONS

Final Office Action mailed Nov. 12, 2009, for U.S. Appl. No. 11/470,579, filed Sep. 6, 2006, 18 pages.

(Continued)

*Primary Examiner* — Michael Faragalla
(74) *Attorney, Agent, or Firm* — Morrison & Foerster LLP

(57) ABSTRACT

Compact touch sensors for touch sensitive devices and processes for forming the touch sensors are disclosed. The touch sensor structure can include a substrate, one or more underlying layers disposed on the substrate, one or more blocking layers disposed on the substrate or on one or more underlying layers, and one or more patterned layers disposed on the underlying layers or blocking layers. The one or more blocking layers can be configured to block underlying layers from exposure to certain wavelengths of light or from penetration of a laser beam that can cause damage. Additionally, the one or more underlying layers can be multi-functional, including the ability to block one or more light sources.

20 Claims, 15 Drawing Sheets

Touch Sensor Structure 400
Light Source 442
Transparent Conductive Film 406
Mask 410
Metal Layer 408
Layers 404
450 Blocking Layer
430 Top Surface
Substrate 402
Bottom Surface 432
Blocking Layer 452
414 Layers
418 Metal Layer
420 Mask
416 Transparent Conductive Layer
440 Light Source

(56) References Cited

U.S. PATENT DOCUMENTS

| | | | | |
|---|---|---|---|---|
| 7,046,230 | B2 | 5/2006 | Zadesky et al. | |
| 7,176,894 | B2 | 2/2007 | Ostergård et al. | |
| 7,184,064 | B2 | 2/2007 | Zimmerman et al. | |
| 7,614,008 | B2 | 11/2009 | Ording | |
| 7,620,174 | B1 | 11/2009 | Bick | |
| 7,663,607 | B2 | 2/2010 | Hotelling et al. | |
| 7,800,592 | B2 | 9/2010 | Kerr et al. | |
| 7,808,479 | B1 | 10/2010 | Hotelling et al. | |
| 7,844,914 | B2 | 11/2010 | Andre et al. | |
| 8,239,784 | B2 | 8/2012 | Hotelling et al. | |
| 8,471,822 | B2 | 6/2013 | Ligtenberg | |
| 8,479,122 | B2 | 7/2013 | Hotelling et al. | |
| 8,570,288 | B2 | 10/2013 | Lai et al. | |
| 9,063,620 | B2 * | 6/2015 | Chan et al. | |
| 2004/0135919 | A1 | 7/2004 | Kim et al. | |
| 2005/0068304 | A1 | 3/2005 | Lewis et al. | |
| 2006/0026535 | A1 | 2/2006 | Hotelling et al. | |
| 2006/0026536 | A1 | 2/2006 | Hotelling et al. | |
| 2006/0033724 | A1 | 2/2006 | Chaudri et al. | |
| 2006/0053387 | A1 | 3/2006 | Ording | |
| 2006/0085757 | A1 | 4/2006 | Andre et al. | |
| 2006/0181517 | A1 | 8/2006 | Zadesky et al. | |
| 2006/0197750 | A1 | 9/2006 | Kerr et al. | |
| 2006/0197753 | A1 | 9/2006 | Hotelling | |
| 2012/0223901 | A1 | 9/2012 | Kim et al. | |
| 2012/0235927 | A1 * | 9/2012 | Ho et al. | 345/173 |
| 2013/0135233 | A1 | 5/2013 | Wang et al. | |
| 2013/0314625 | A1 * | 11/2013 | Tsai et al. | 349/12 |
| 2015/0212609 | A1 | 7/2015 | Tung | |

FOREIGN PATENT DOCUMENTS

| | | | |
|---|---|---|---|
| GB | 2 348 075 | A | 9/2000 |
| JP | 2000-163031 | A | 6/2000 |
| JP | 2002-342033 | A | 11/2002 |
| JP | 2003-067128 | A | 3/2003 |
| WO | WO-02/35333 | A1 | 5/2002 |
| WO | WO-2005/053287 | A1 | 6/2005 |
| WO | WO-2005/114369 | A2 | 12/2005 |
| WO | WO-2005/114369 | A3 | 12/2005 |
| WO | WO-2008/030563 | A2 | 3/2008 |
| WO | WO-2008/030563 | A3 | 3/2008 |

OTHER PUBLICATIONS

Final Office Action mailed Feb. 16, 2011, for U.S. Appl. No. 11/470,579, filed Sep. 6, 2006, 18 pages.

International Search Report mailed Mar. 25, 2008, for PCT Application No. PCT/US2007/019551, filed Sep. 5, 2007, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed May 12, 2009, for U.S. Appl. No. 11/470,579, filed Sep. 6, 2006, 15 pages.

Non-Final Office Action mailed Aug. 31, 2010, for U.S. Appl. No. 11/470,579, filed Sep. 6, 2006, 18 pages.

Non-Final Office Action mailed Nov. 3, 2011, for U.S. Appl. No. 11/470,579, filed Sep. 6, 2006, 21 pages.

Notice of Allowance mailed Jun. 14, 2012, for U.S. Appl. No. 11/470,579, filed Sep. 6, 2006, 7 pages.

Notice of Allowance mailed Mar. 4, 2013, for U.S. Appl. No. 11/470,579, filed Sep. 6, 2006, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Supplemental Notice of Allowance mailed Jun. 26, 2012, for U.S. Appl. No. 11/470,579, filed Sep. 6, 2006, four pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report mailed Feb. 2, 2015, for CN Application No. CN 201210337058.6, filed Sep. 5, 2007, two pages.

* cited by examiner

DOUBLE SIDED TOUCH SENSOR ON TRANSPARENT SUBSTRATE

FIELD

This relates generally to touch sensor devices, and in particular, to a process for fabricating touch sensor panels for touch sensitive devices.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and a computing system can interpret the touch event in accordance with the display appearing at the time of the touch event, and thereafter can perform one or more actions based on the touch event.

One type of touch sensor panel that can be used is a capacitive touch sensor panel. Typical capacitive touch sensor panels can include a grid formed by rows of drive lines intersecting columns of sense lines. The drive lines can be driven by stimulation signals that cause the capacitively coupled sense lines to generate output touch signals representative of touch events detected on the surface of the panel. The drive lines and sense lines can be fabricated on the touch sensor panel using various processes, such as lithography, printing, or laser ablation. Fabricating the touch sensor panel using lithography can be useful for patterning multiple features at once, reducing fabrication time. However, exposure from a light source during the lithography process can penetrate to underlying layers, either on the same side or on the opposite side of the substrate, and alter the properties of those underlying layers. Fabricating the touch sensor panel using laser ablation can be useful for achieving finer patterns for the drive and sense lines. However, the laser ablation process can damage the underlying layers or substrate when the material to be patterned, such as indium tin oxide (ITO) for the drive and sense lines, has a high ablation fluence value.

SUMMARY

Processes for fabricating compact touch sensors for touch sensitive devices are disclosed. A process can include providing a touch sensor structure having a substrate, one or more underlying layers optionally disposed on the substrate, one or more blocking layers disposed on the substrate or on one or more underlying layers, and one or more patterned layers disposed on the underlying layers or blocking layers. The one or more blocking layers can be formed to block underlying layers from exposure to certain wavelengths of light or from penetration of a laser beam that can cause damage.

BRIEF DESCRIPTION OF THE DRAWINGS

FIG. 8B illustrates an exemplary stackup for an IR blocking layer designed to block IR light, while allowing visible light to pass through.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This disclosure relates to processes for fabricating compact touch sensors for touch sensitive devices. A process can include providing a touch sensor structure having a substrate, one or more underlying layers optionally disposed on the substrate, one or more blocking layers disposed on the substrate or on one or more underlying layers, and one or more patterned layers disposed on the underlying layers or blocking layers. In some examples, one or more passivation layers can be disposed on the patterned layers. The one or more underlying layers, blocking layers, and patterned layers can be deposited on the same side of the substrate or on different sides of the substrate. The processes can be used in sheet-to-sheet processes for rigid or flexible substrates, roll-to-roll processes for flexible substrates, or processes for curved substrates.

Figure 1:
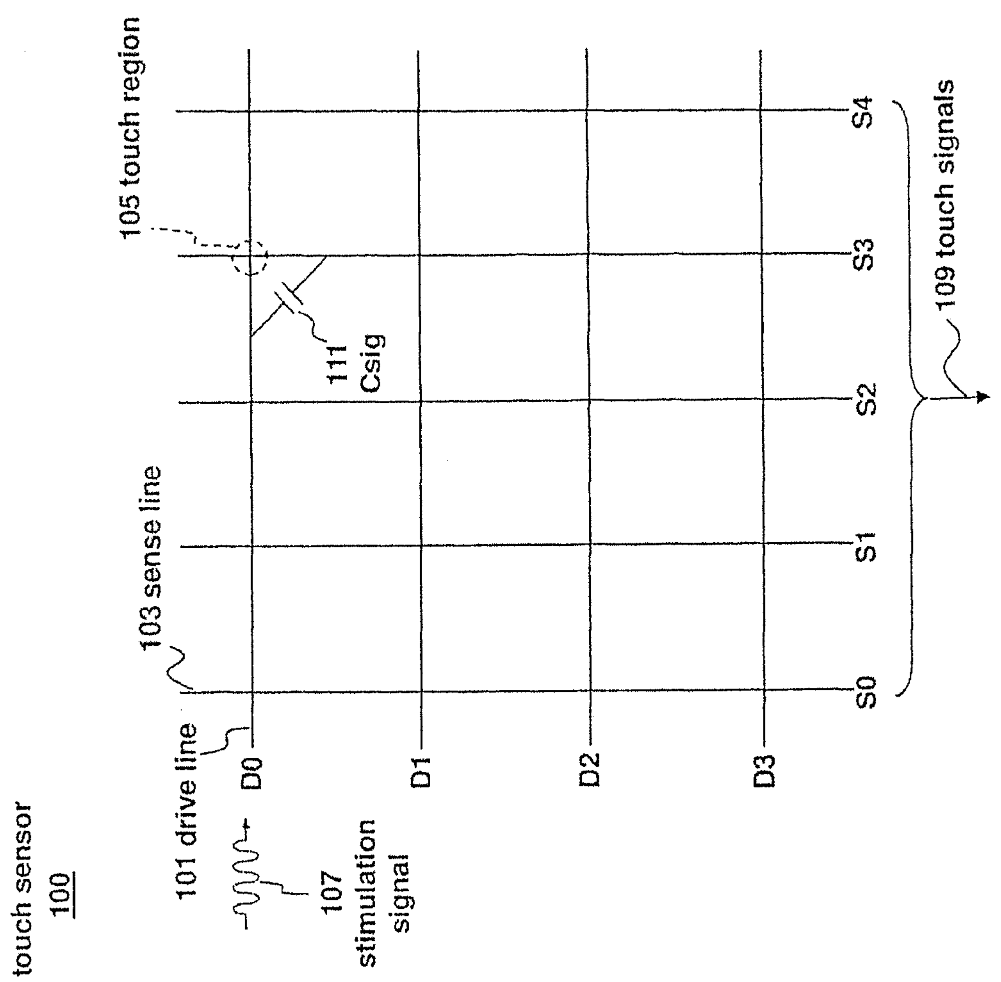
FIG. 1 illustrates an exemplary touch sensor that can be used to detect touch events on a touch sensitive device

FIG. 1 illustrates an exemplary touch sensor 100 that can be used to detect touch events on a touch sensitive device, such as a mobile phone, tablet, touchpad, portable computer, portable media player, or the like. Touch sensor 100 can include an array of touch regions 105 that can be formed at the crossing points between rows of drive lines 101 (D0-D3) and columns of sense lines 103 (S0-S4). Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can transmit touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When a user's finger (or other object) touches or hovers over the touch sensor 100, the finger can cause the capacitance Csig 111 to reduce by an amount ΔCsig at the touch location. This capacitance change ΔCsig can be caused by charge or current from the stimulated drive line 101 being shunted through the touching finger to ground rather than being coupled to the crossing sense line 103 at the touch location. The touch signals 109 representative of the capacitance change ΔCsig can be transmitted by the sense lines 103 to the sense circuitry for processing. The touch signals 109 can indicate the touch region where the touch occurred and the amount of touch that occurred at that region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Touch sensor panels can be implemented as an array of pixels formed by multiple drive lines (e.g. rows) crossing over multiple sense lines (e.g. columns), where the drive lines and sense lines can be separated by a dielectric material. In some touch sensor panels, the drive and sense lines can be formed on the top and bottom sides of the same transparent substrate. In other touch sensor panels, the drive and sense lines may formed on one side of the transparent substrate. The drive lines and sense lines can be formed from a substantially transparent material, such as Indium Tin Oxide (ITO), although other materials can also be used. The ITO layer(s) can be deposited on one or both sides of the transparent substrate. Touch sensor panels with double or single sided ITO layers are referred to as double-sided ITO (DITO) touch sensor panels and single-sided ITO (SITO) touch sensor panels, respectively, in the disclosure.

Figure 2:
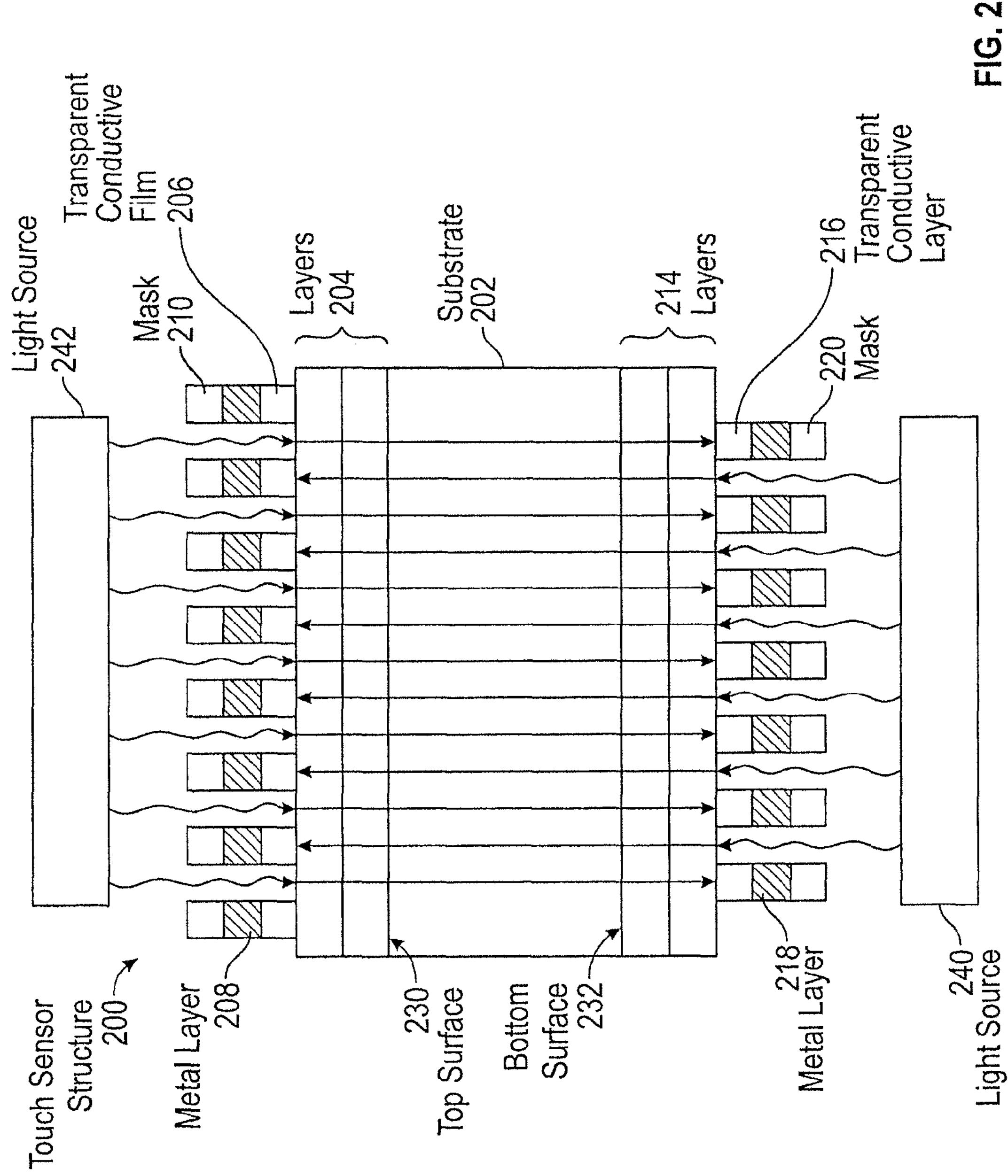
FIG. 2 illustrates a cross-sectional view of an exemplary DITO touch sensor structure stackup.

FIG. 2 illustrates a cross-sectional view of an exemplary DITO touch sensor structure 200 stackup. Touch sensor structure 200 can include a substrate 202 made of any transparent substrate material, such as plastic, glass, quartz, a rigid or flexible glass, or a rigid or flexible composite. Touch sensor structure 200 can further include one or more layers 204 and 214, such as a hard coating layer or an index matching layer, disposed on the top surface 230 and bottom surface 232 of substrate 202. Drive lines can be formed by disposing a layer of transparent conductive film 206 on layers 204, and sense lines can be formed by disposing a layer of transparent conductive film 216 on layers 214. Transparent conductive films 206 and 216 can be any electrically conductive material, such as ITO, IZO, ITZO, AgNW, AgCl, CNT, Graphene, other metals, other oxides, or the like. Metal layers 208 and 218 can be deposited on the transparent conductive film 206 and 216 for forming routing traces for the drive and sense lines of the touch sensor structure 200. The metal layers 208 and 218 can be made of copper or any other metal suitable for routing signals on the touch sensor structure 200. The transparent conductive film 206 and metal layer 208 can be patterned to form the drive lines and routing traces for the drive lines by depositing a mask 210. Similarly, transparent conductive film 216 and metal layer 218 can be patterned to form the sense lines and routing traces for the sense lines by depositing a mask 220. Masks 210 and 220 can include any light sensitive material, such as photoresist. Exposure of portions of the masks 210 and 220 to light, such as ultraviolet (UV) light, can alter the chemistry of the mask and change one or more properties, such as solubility, relative to the unexposed portions. Layers 204 and 214, transparent conductive films 206 and 216, metal layers 208 and 218, and masks 210 and 220 can be formed at the same time. Both sides of the touch sensor structure can be exposed to light sources, such as light sources 240 and 242, for forming patterns for the drive and sense lines and routing traces. Light from the light sources can penetrate from both sides of the substrate and reach the other sides of the substrate, causing backside interference and inadvertently altering the properties of one of the masks 210 or 220 or both. Altering the properties of one or more masks can lead to unwanted changes in the feature sizes of the drive and/or sense lines. In some examples, a laser source, such as one used in laser ablation, can penetrate from both sides of the substrate and reach the other sides of the substrate, causing backside interference or damage to one or more underlying layers, altering the properties of the masks, underlying layers, transparent conductive films, or metal layers.

Once the drive and sense lines and routing traces for the drive and sense lines are patterned, masks 210 and 220 can be removed. Metal layers 208 and 218 in the visible area of the touch sensor structure can be removed, and an optional passivation layer can be deposited on top. Passivation layer can be made of any material that can protect and/or planarize the touch sensor structure 200 including any organic material, such as a polymer or an optically clear adhesive. In some examples, masks 210 and 220 can serve as a multi-purpose material and may act not only as a mask during patterning but also as a passivation layer.

Figure 3:
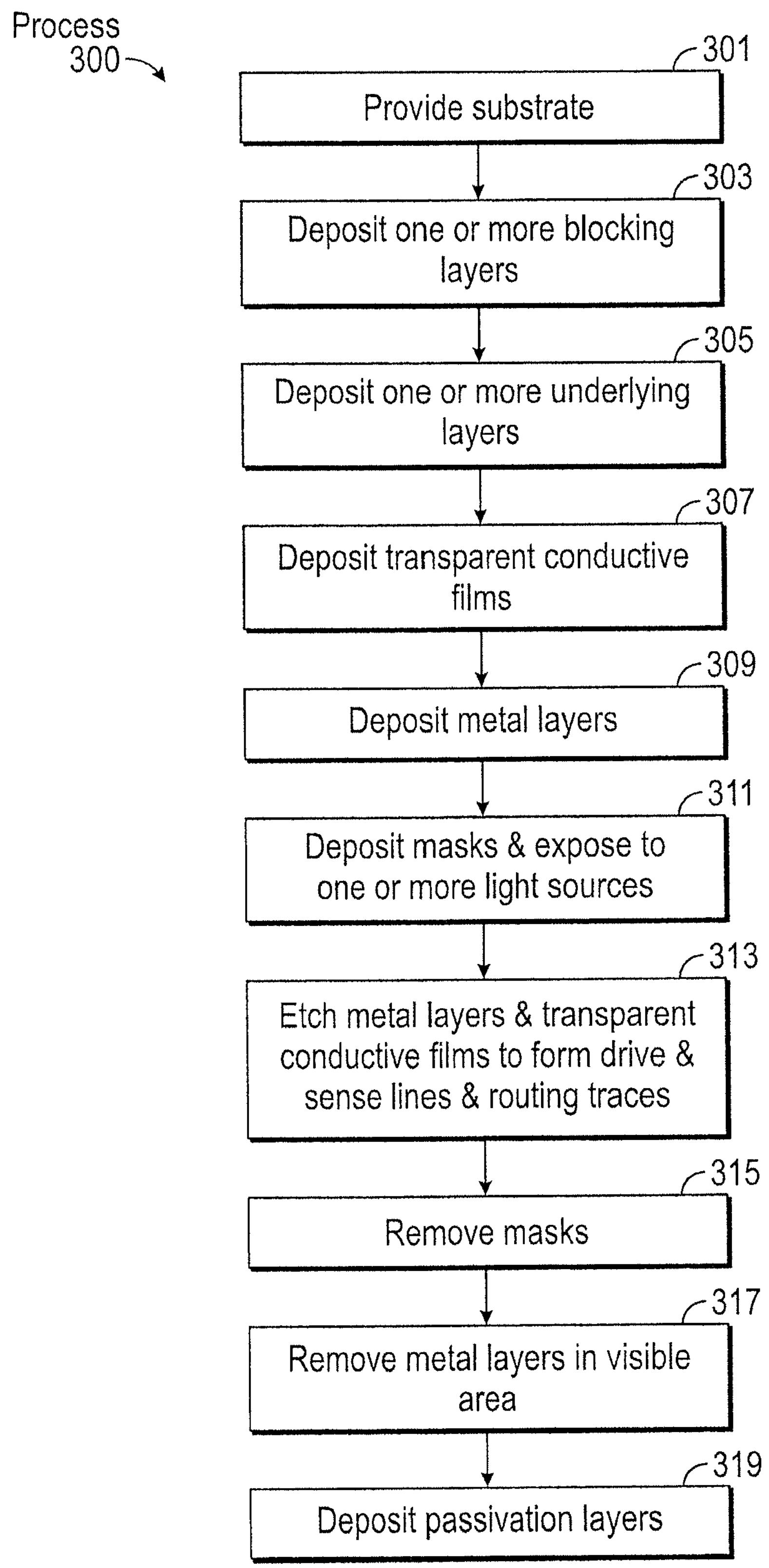
FIG. 3 illustrates an exemplary process for manufacturing a touch sensor similar or identical to touch sensor of FIG. 2.
Figure 4:
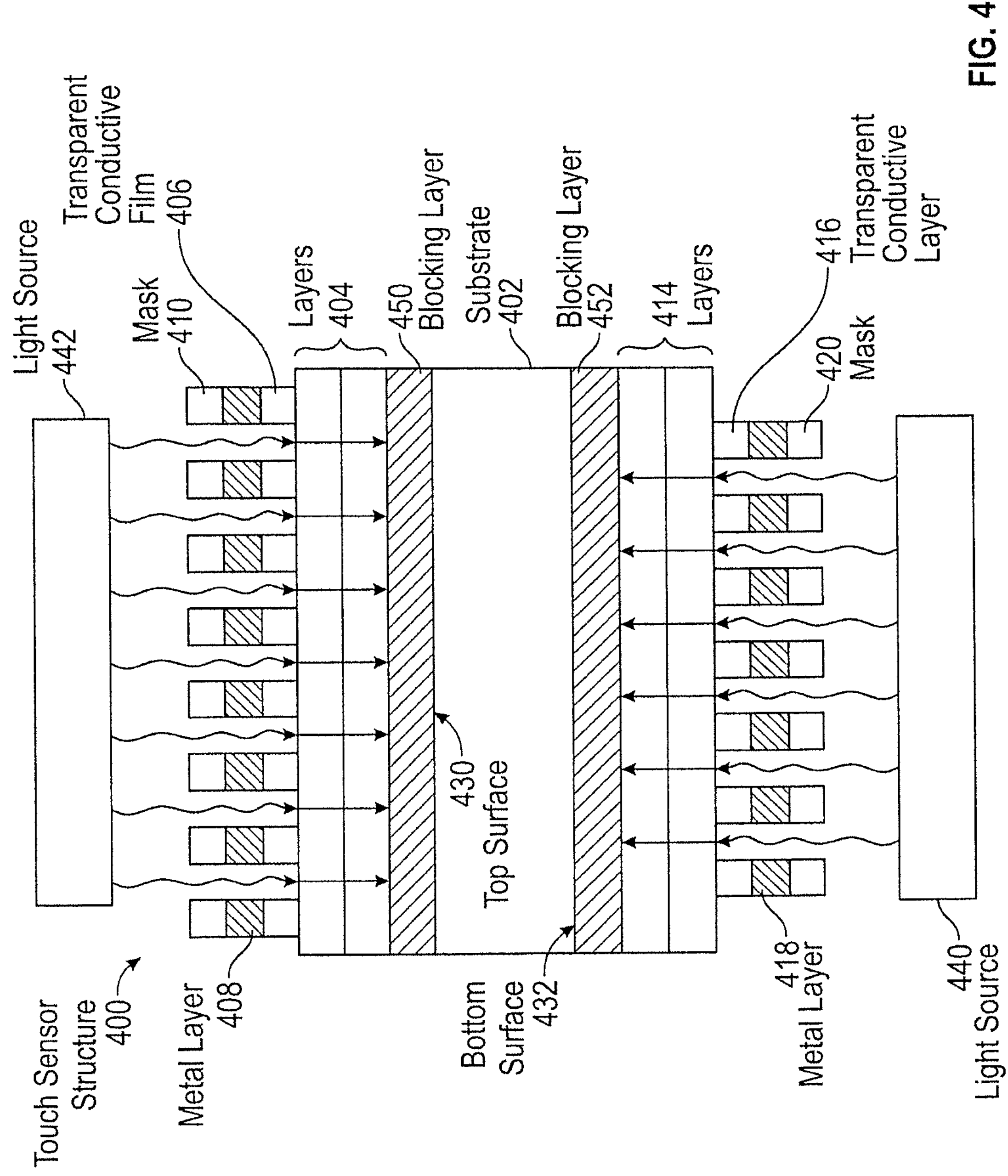
FIG. 4 illustrates an exemplary cross-sectional view of an exemplary DITO touch sensor structure stackup with blocking layers.

The touch sensor structure can include one or more blocking layers to one or more sides of the substrate. FIG. 3 illustrates an exemplary process 300 for manufacturing a touch sensor similar or identical to touch sensor 100. Process 300 can be described below with reference to FIG. 4. FIG. 4 illustrates an exemplary cross-sectional view of an exemplary DITO touch sensor structure 400 stackup with blocking layers. The exemplary touch sensor structure 400 of FIG. 4 can be used in process 300. At block 301, a substrate can be provided. Substrate 402 can be made of any substrate material, such as plastic, glass, or quartz. At block 303, one or more blocking layers 450 and 452 can be disposed on the top surface 430 and bottom surface 432. At block 305, one or more layers 404 and 414 can be disposed on the blocking layers 450 and 452. Layers 404 and 414 can include, for example, hard coating layers and index matching layers. At block 307, transparent conductive films 406 and 416 can be deposited, and at block 309, metal layers 408 and 418 can be deposited. At block 311, masks 410 and 420 can be deposited.

Light sources 440 and 442 can be directed at the touch sensor structure 400 for exposing portions of the masks 410 and 420 to form a pattern to be transferred to the metal layers 408 and 418 and transparent conductive films 406 and 416. During exposure of the touch sensor structure to the light sources 440 and 442, blocking layers 450 and 452 can prevent unwanted backside light interference. At block 313, the transparent conductive films 406 and 416 can be etched to form the drive and sense lines. At block 315, masks 410 and 420 can be removed. At block 317, metal in the visible area can be removed, and at block 319, an optional passivation or planarization layer can be deposited. While FIGS. 3-4 illustrate blocking layers 450 and 452 disposed between the substrate 402 and the layers 404 and 414, blocking layers 450 and 452 can be disposed anywhere between the transparent conductive films 406 and 416 and the substrate 402 such that they block underlying layers. In some examples, the blocking layer 450 can be disposed between layers 404 and transparent conductive film 406. In some examples, the blocking layer 452 can be disposed between layers 414 and transparent conductive film 416. In some examples, the blocking layers 450 and/or 452 can be disposed between any of the layers 404 or 414, such as between a hard coating layer and an index matching layer. While FIG. 4 illustrates two blocking layers 450 and 452, examples of the disclosure include, but are not limited to, one or more than two blocking layers. Additionally, examples of the disclosure are not limited to the location of the blocking layers and the number of blocking layers being the same on both sides of the substrates. In some examples, the blocking layers can be utilized in touch sensor panels employing a SITO arrangement.

In some examples, one or more layers of FIG. 4 can be chosen to be multi-functional layers such that at least one of the functions includes blocking backside interference. For example, the index matching layer can be multi-functional including index matching for improved optical uniformity and blocking for preventing certain types of light from penetrating through. In some examples, the substrate can be chosen to have an inherent property of blocking certain wavelengths of light. The substrate can pass through certain wavelengths, such as light in the visible spectrum, while also blocking other wavelengths, such as light in the UV spectrum. By choosing a substrate with an inherent property of blocking certain wavelengths of light, a thinner touch sensor panel can be achieved. In some examples, the one or more blocking layers can cover certain portions of the touch screen. In some examples, the one or more blocking layers can comprise two or more different sections. For example, the border region, where the routing traces are located, can have one type of blocking layer, and the visible area, where the touch sensors are located, can have another type of blocking layer.

The blocking layer can comprise a single layer or multiple sublayers that block specific wavelengths or one or more wavelength ranges. Additionally, a blocking layer can be chosen based on the amount of transmittance allowed to pass through. The blocking layer can be categorized based on this transmittance. For example, an ultra-high blocking layer can have a transmittance less than 1%. A high blocking layer can have a transmittance between 1% and 20%. A good blocking layer can have a transmittance between 20% and 40%, and a standard blocking layer can have a transmittance between 40% and 60%. The blocking layer can be deposited using different deposition techniques such as sputtering, evaporation, molecular-beam epitaxy, chemical vapor deposition, and printing.

Figure 5A:
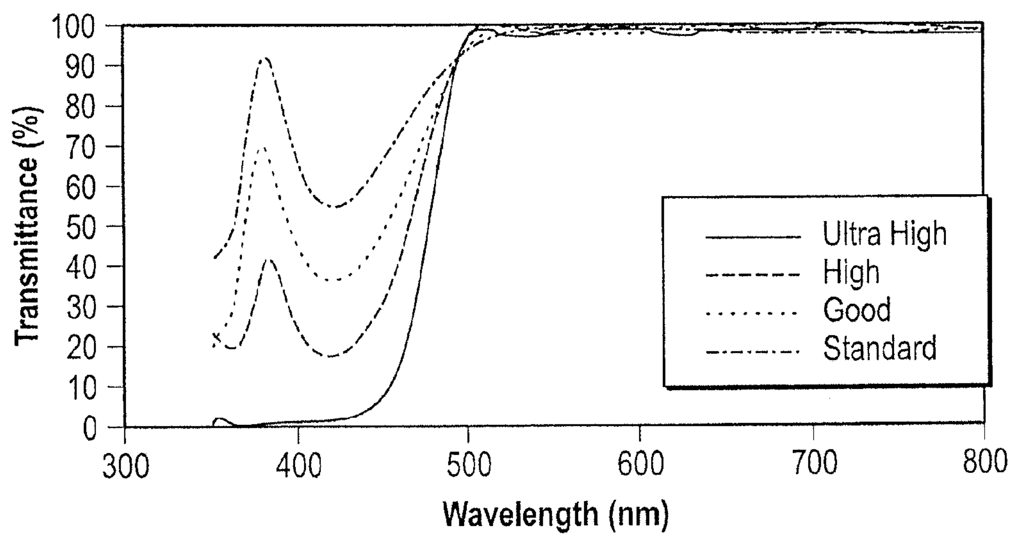
FIG. 5A illustrates a plot of transmittance in the UV spectrum for exemplary ultra-high, high, good, and standard UV blocking layers.
Figure 5B:
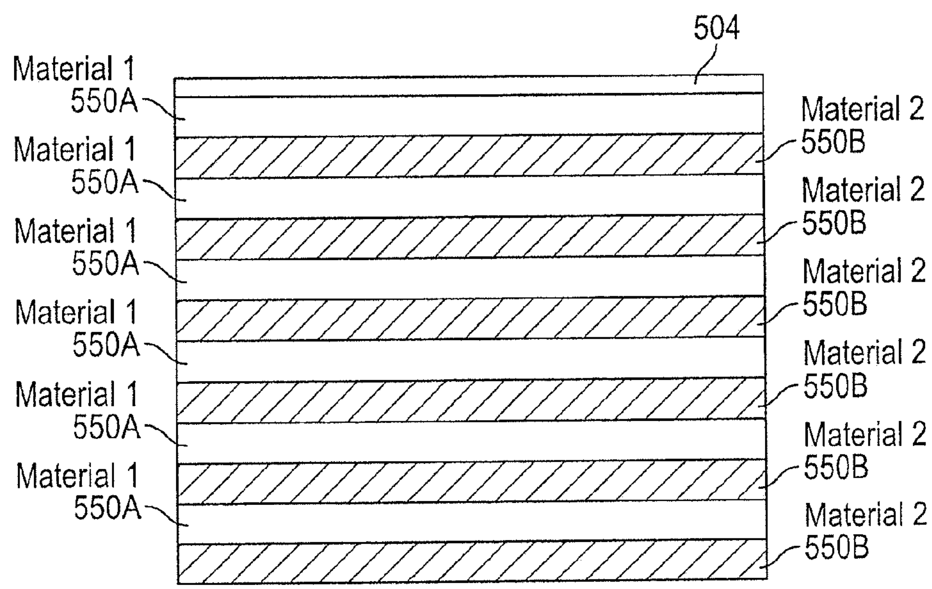
FIG. 5B illustrates an exemplary stackup for a blocking layer designed to block UV light.

FIG. 5A illustrates a plot of transmittance in the UV spectrum for exemplary ultra-high, high, good, and standard UV blocking layers. The blocking layer can be chosen to shield or block certain wavelengths of light, such as UV light, while allowing other wavelengths of light, such as visible light, to pass through. FIG. 5B illustrates an exemplary stackup for a blocking layer designed to block UV light. The example blocking layer includes 12 sublayers alternating between a high refractive index material, material 1 550A, and a low refractive index material, material 2 550B. For example, material 1 550A can be $TiO_2$ and material 2 550B can be $MgF_2$. The thickness of each sublayer can be determined based on the type of desired blocking layer (e.g. ultra-high, high, good, or standard). Example thickness values for each sublayer are shown in Table 1 below:

TABLE 1

| Sublayer | Material | Refractive index | Extinction coefficient | Thickness (nm) |
|---|---|---|---|---|
| 1 | $TiO_2$ | 2.54627 | 0.00253 | 12.67 |
| 2 | $MgF_2$ | 1.3899 | 0 | 89.96 |
| 3 | $TiO_2$ | 2.54627 | 0.00253 | 46.52 |
| 4 | $MgF_2$ | 1.3899 | 0 | 58.62 |
| 5 | $TiO_2$ | 2.54627 | 0.00253 | 38.35 |
| 6 | $MgF_2$ | 1.3899 | 0 | 79 |
| 7 | $TiO_2$ | 2.54627 | 0.00253 | 41.07 |
| 8 | $MgF_2$ | 1.3899 | 0 | 60.2 |
| 9 | $TiO_2$ | 2.54627 | 0.00253 | 43.16 |
| 10 | $MgF_2$ | 1.3899 | 0 | 73.16 |
| 11 | $TiO_2$ | 2.54627 | 0.00253 | 22.05 |
| 12 | $MgF_2$ | 1.3899 | 0 | 70.26 |

The exemplary blocking layer in FIG. 5B and Table 1 was designed as an ultra-high UV blocking layer for an g, h, i-line standard lithography process. The refractive index and extinction coefficient values are given at 380 nm. While FIG. 5B is one example blocking layer, any number of different configurations or materials can be employed. In some examples, the blocking layer can have a gradient refractive index. In some examples, the blocking layer can be a filter, such as a high pass, low pass, broadband, or narrow band filter. In some examples, the blocking layer can be designed to prevent penetration of light at specific wavelengths typical of exposure systems for lithography, such as 365 nm, 405 nm, and 436 nm. In some examples, one or more sublayers can include a diffraction grating or can be made from a material composite comprised of nanoparticles or dye.

Some touch sensor panels can be processed using laser ablation instead of or in addition to lithography. The precise control with laser ablation can be used to achieve finer patterning and smaller distances between lines and traces. However, the laser ablation process can damage the underlying layers or substrate when the underlying layers and/or substrate absorb the energy from the laser. Laser ablation removes a material by irradiating the material with high power laser pulses. The material can absorb the energy from the laser, heat up, and then be removed by vaporization. If the energy of the absorbed laser pulse is sufficient to break the chemical bonds of the material, the material can be ablated. The depth that the laser can penetrate and remove material can depend on several factors, such as the laser beam energy density, or laser fluence value, and absorption coefficient of the material at wavelengths of the laser beam. A material can have what is known as an ablation fluence value, which is an energy value (energy per unit area) or a threshold level needed by the laser beam in order for ablation of the material can occur. As the material is being ablated, the laser can penetrate to underlying layers. The underlying layers can be etched or damaged if the underlying layers are capable of absorbing energy at the same wavelength as the laser emission wavelength, and also if the laser beam has a fluence value that is greater than or equal to the ablation fluence value of the underlying layers.

Figure 6:
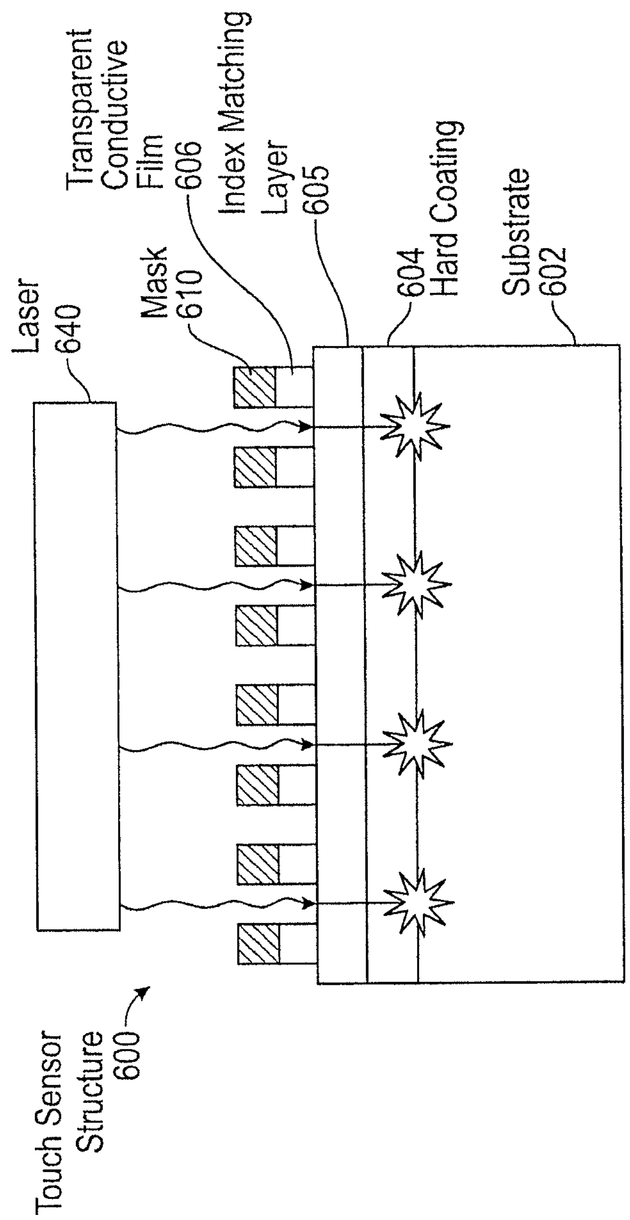
FIG. 6 illustrates a cross-sectional view of an exemplary SITO touch sensor structure stackup.

FIG. 6 illustrates a cross-sectional view of an exemplary SITO touch sensor structure 600 stackup. Touch sensor structure 600 can include a substrate 602. Touch sensor structure 600 can further include one or more layers, such as a hard coating layer 604 and an index matching layer 605, disposed on the substrate 602. Drive lines or sense lines can be formed by disposing a layer of transparent conductive film 606 on the hard coating and index matching layers 604 and 605. A mask 610 can be deposited on the transparent conductive film 606 for patterning. A laser or light source 640 can be directed at the touch sensor structure 600. Once the pattern of the mask 610 is transferred to the transparent conductive film 606 and transparent conductive film is etched, the laser can be incident on one or more of the hard coating layer 604, index matching layer 605, substrate 602, or any underlying layers in the touch sensor structure 600. If one or more underlying layers can absorb energy at the laser emission wavelength and the laser fluence value is greater than or equal to the ablation fluence value of the underlying layers, the underlying layers can be removed and/or damaged. Degradation in their material properties can result from film distortion, wrinkling, or change in electrical or optical properties, and as a result, can lead to degradation in the performance of the touch sensor panel. The damage from the laser beam can occur during the patterning of any of the layers, such as the drives line, the sense lines, or routing traces.

Figure 7:
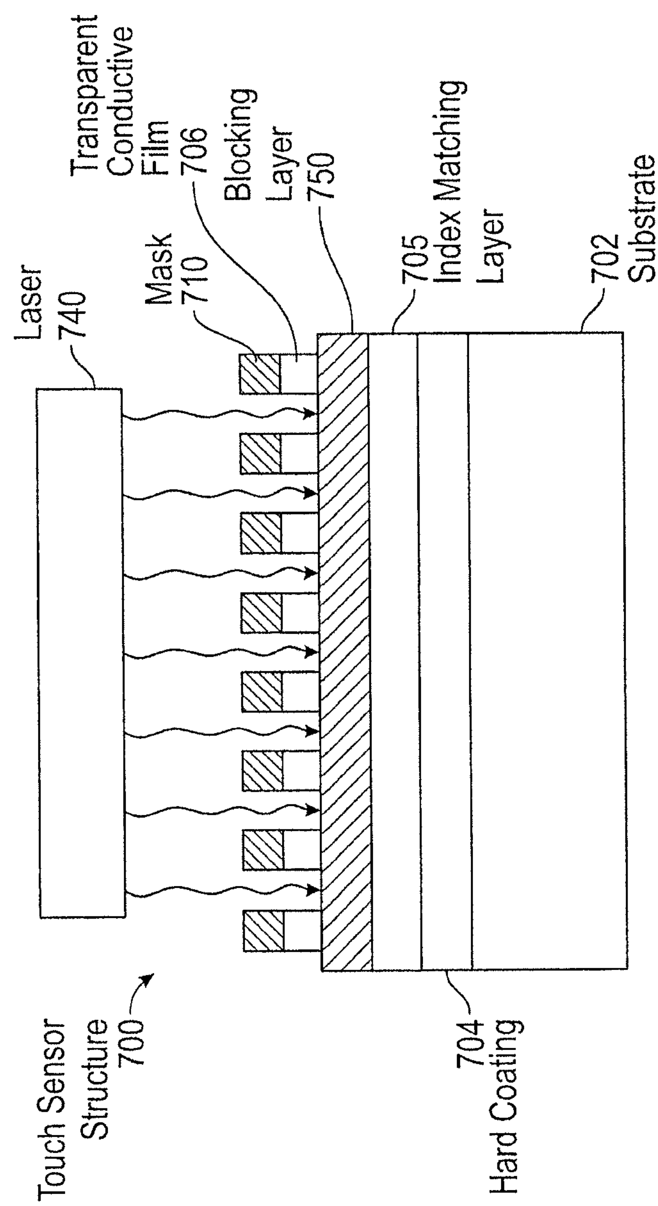
FIG. 7 illustrates a cross-sectional view of an exemplary SITO touch sensor structure stackup with a blocking layer.

One or more blocking layers can be added to one or more sides of the touch sensor structure. FIG. 7 illustrates a cross-sectional view of an exemplary SITO touch sensor structure 700 stackup with a blocking layer. Touch sensor structure 700 can include substrate 702, hard coating layer 704, index matching layer 705, blocking layer 750, transparent conductive film 706, and mask 710. When a light source, such as a laser beam 740, is directed at the touch sensor structure 700 for etching portions of a layer, such as the transparent conductive film 706, a blocking layer 750 can prevent penetration of the laser beam 740 to layers underneath the blocking layer 750, such as the hard coating layer 704, index matching layer 705, and substrate 702. While FIG. 7 illustrates blocking layer 750 disposed between index matching layer 705 and transparent conductive film 706, the blocking layer 750 can be disposed anywhere beneath the layer being patterned by the laser ablation process. In some examples, the blocking layer 750 can be disposed between the substrate 702 and the hard coating layer 704. In some examples, the blocking layer 750 can be disposed between the hard coating layer 704 and the index matching layer 705. In some examples, the touch sensor structure 700 can comprise additional layers and the blocking layer may be disposed anywhere within the structure, but below the layer to be patterned, such as the transparent conductive film 706. In some examples, the touch sensor structure can be a DITO stackup, and one or more blocking layers can be disposed on either side of the substrate or both sides.

The blocking layer 750 can comprise one or more sublayers that have strong absorbing or reflecting properties at the laser emission wavelengths. For example, the laser source can have an emission wavelength in the UV spectrum from 150 nm to 400 nm. The blocking layer 750 can include one or more sublayers with strong absorbing or reflecting properties in the wavelength range of 150 nm to 400 nm. Alternatively, a near-infrared (NIR) laser source can be used with an emission wavelength from 800 nm to 1100 nm, and a blocking layer can absorb and/or reflect the laser energy in that wavelength range.

Figure 8A:
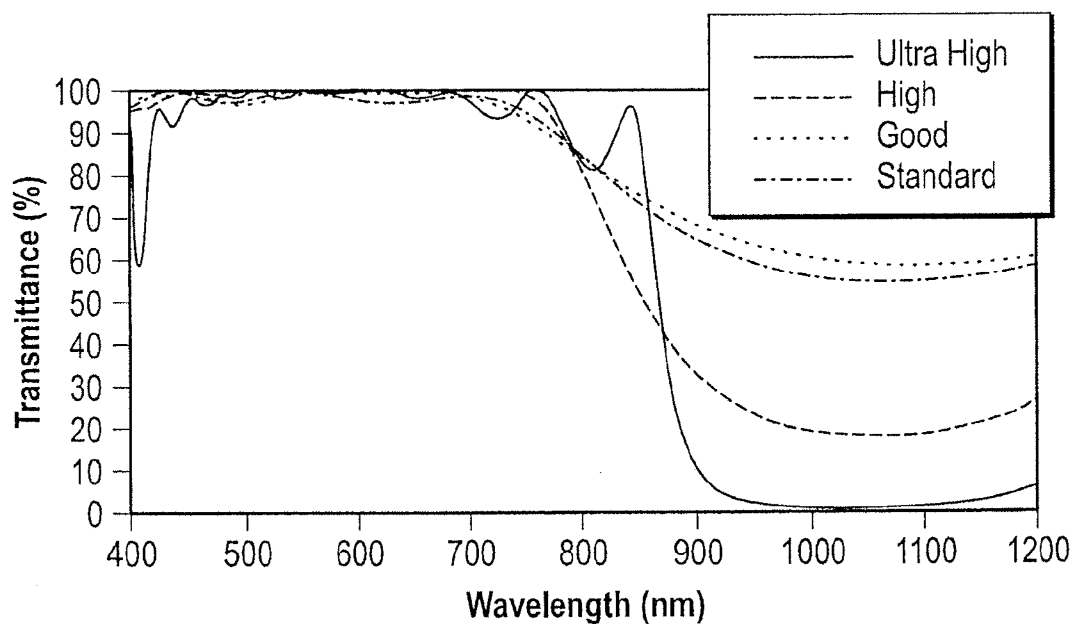
FIG. 8A illustrates a plot of transmittance in the visible and NIR spectrum for exemplary ultra-high, high, good, and standard infrared (IR) blocking layers.
Figure 8B:
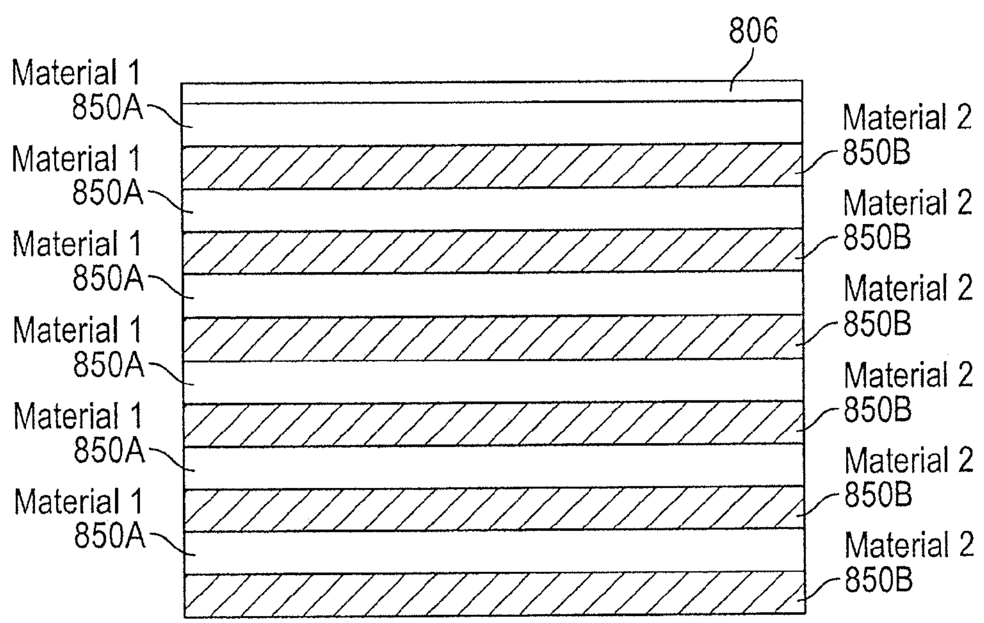

FIG. 8A illustrates a plot of transmittance in the visible and NIR spectrum for exemplary ultra-high, high, good, and standard infrared (IR) blocking layers. Any one of the blocking layers can prevent at least a partial amount of energy from penetrating to one or more layers underneath the blocking layers from, for example, an incident NIR laser source. Additionally, the blocking layer can be transparent to other wavelengths of light, such as visible light. The IR blocking layer can then prevent damage or degradation of touch sensor panel due to manufacturing without affecting the visibility of a display located under the touch sensor panel. FIG. 8B illustrates an exemplary stackup for an IR blocking layer designed to block IR light, while allowing visible light to pass through. The IR blocking layer stackup shown in the figure can include 12 sublayers alternating between a low refractive index material, material 1 850A, and a high refractive index material, material 2 805B. For example, material 1 850A can be $MgF_2$ and material 2 550B can be $TiO_2$. The thickness of each sublayer can be determined based on the type of desired blocking layer (e.g. ultra-high, high, good, or standard). Example thickness values for each sublayer are shown in Table 2 below:

TABLE 2

| Sublayer | Material | Refractive index | Extinction coefficient | Thickness (nm) |
|---|---|---|---|---|
| 1 | $MgF_2$ | 1.3803 | 0 | 91.58 |
| 2 | $TiO_2$ | 2.25 | 0 | 105.65 |
| 3 | $MgF_2$ | 1.3803 | 0 | 192.19 |
| 4 | $TiO_2$ | 2.25 | 0 | 115.87 |
| 5 | $MgF_2$ | 1.3803 | 0 | 194.09 |
| 6 | $TiO_2$ | 2.25 | 0 | 113.01 |
| 7 | $MgF_2$ | 1.3803 | 0 | 187.96 |
| 8 | $TiO_2$ | 2.25 | 0 | 110.31 |
| 9 | $MgF_2$ | 1.3803 | 0 | 188.66 |
| 10 | $TiO_2$ | 2.25 | 0 | 111.51 |
| 11 | $MgF_2$ | 1.3803 | 0 | 191.1 |
| 12 | $TiO_2$ | 2.25 | 0 | 115.15 |

The exemplary blocking layer in FIG. 8B and Table 2 was designed as an ultra-high IR blocking layer for a standard YAG laser to be used for a laser ablation process. The refractive index and extinction coefficient values are given at 1064 nm. Additionally, the blocking layer can include one or more of a high pass filter, low pass filter, narrowband filter, broadband filter, diffraction grating, material with gradient refractive index, or a material composite comprising nanoparticles.

In addition or alternatively to one or more blocking layers chosen based on absorbing or reflecting wavelengths of the blocking layer, the blocking layer can be based on the ablation fluence value. The blocking layer can have an ablation fluence value that is greater than the laser fluence value, while the layer to be patterned can have an ablation fluence value that is equal or less than the laser fluence value. Thus, when a laser has a laser fluence value that is greater than or equal to the ablation fluence value of the layer to be patterned, such as the transparent conductive film 706, and less than the ablation fluence value of the blocking layer 750, portions of the transparent conductive film 706 can be removed without removing the blocking layer and without damaging underlying layers, such as the index matching layer, hard coating layer, and substrate. For example, transparent conductive film 706 can have a fluence value that is greater than 2 $mJ/cm^2$ and the blocking layer can have an ablation fluence value of approximately 60-100 mJ/cm$^2$. Thus, a laser with a laser fluence value between 2-60 mJ/cm$^2$ can be applied to the touch sensor structure 700 to selectively pattern the drive or sense lines from the transparent conductive film 706 without damage or degradation to the properties of the touch sensor structure.

In some examples, one or more layers of FIG. 7 can be chosen to be multi-functional layers such that at least one of the functions includes blocking penetration of the laser beam. For example, the index matching layer can be multi-functional including index matching for improved optical uniformity and blocking of the laser beam. In some examples, the substrate can be chosen to have an inherent property of absorbing or reflecting at wavelengths outside of the visible spectrum and/or can have an ablation fluence value greater than the laser fluence value. By choosing a substrate or one or more layers with an inherent property of blocking the laser beam from penetrating, a separate layer for blocking can be avoided and a thinner touch sensor panel can be achieved. In some examples, the one or more blocking layers can cover certain portions of the touch screen. In some examples, the one or more blocking layers can comprise two or more different materials. For example, the border region where the routing traces are located can have one type of blocking layer, and the visible area where the touch sensors are located can have another type of blocking layer. In some examples, the touch sensor structure can include one or more different types of blocking layers, such as both a UV blocking layer and an IR blocking layer.

Figure 9:
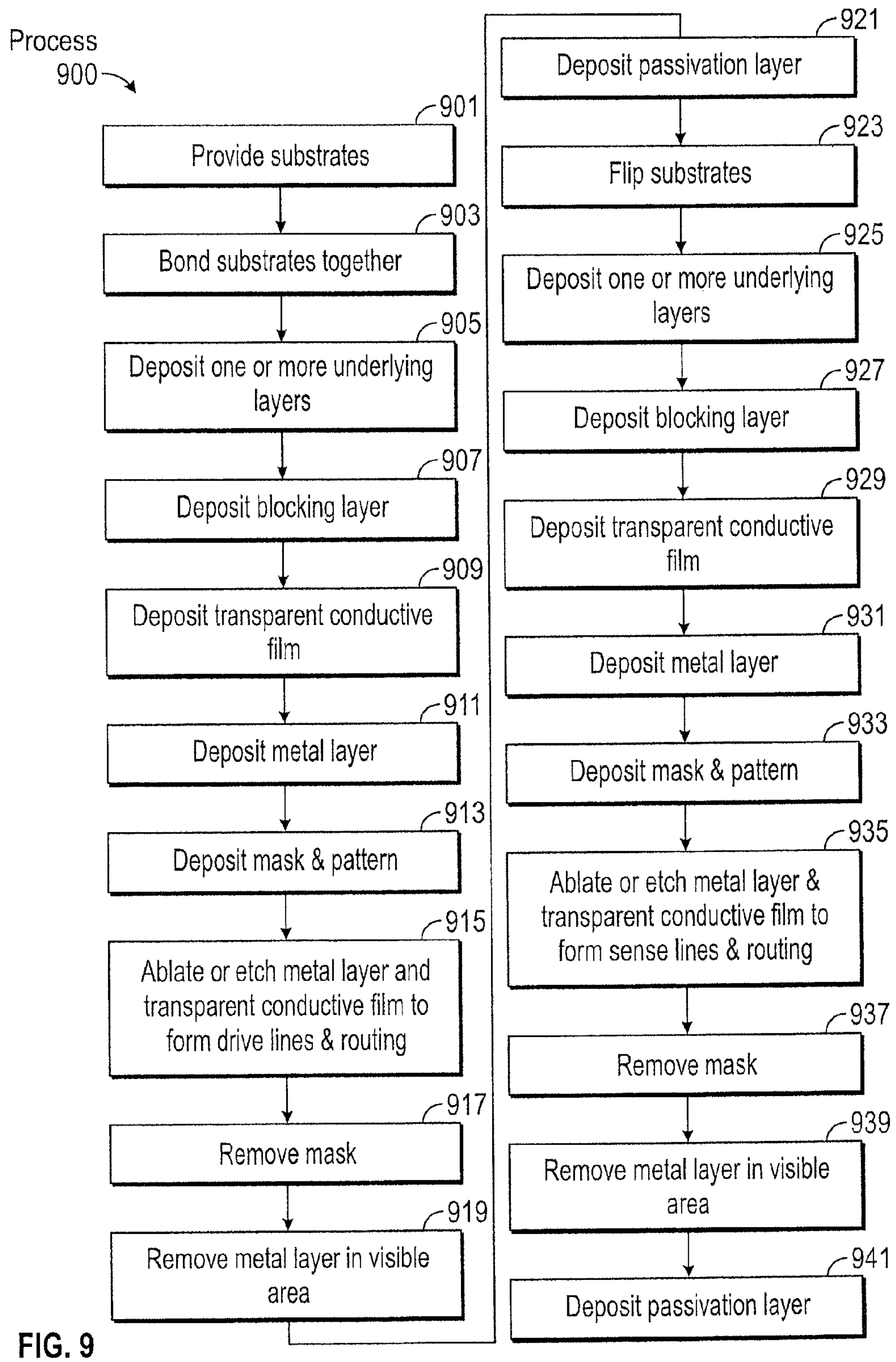
FIG. 9 illustrates an exemplary process for manufacturing a touch sensor using a two substrate lamination process.
Figure 10A:
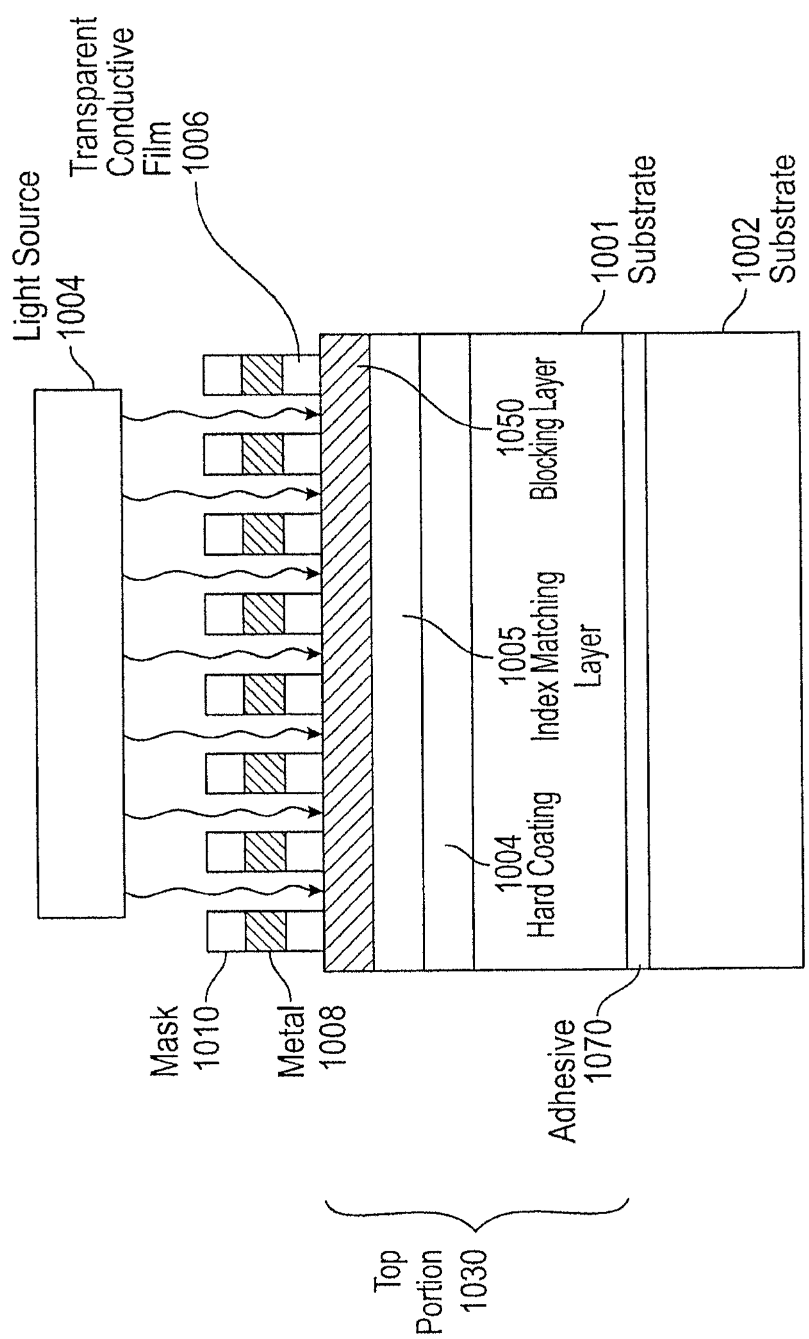
FIGS. 10A-10D illustrate cross-sectional views of an exemplary touch sensor structure stackup formed using a two substrate lamination process with blocking layers.
Figure 10B:
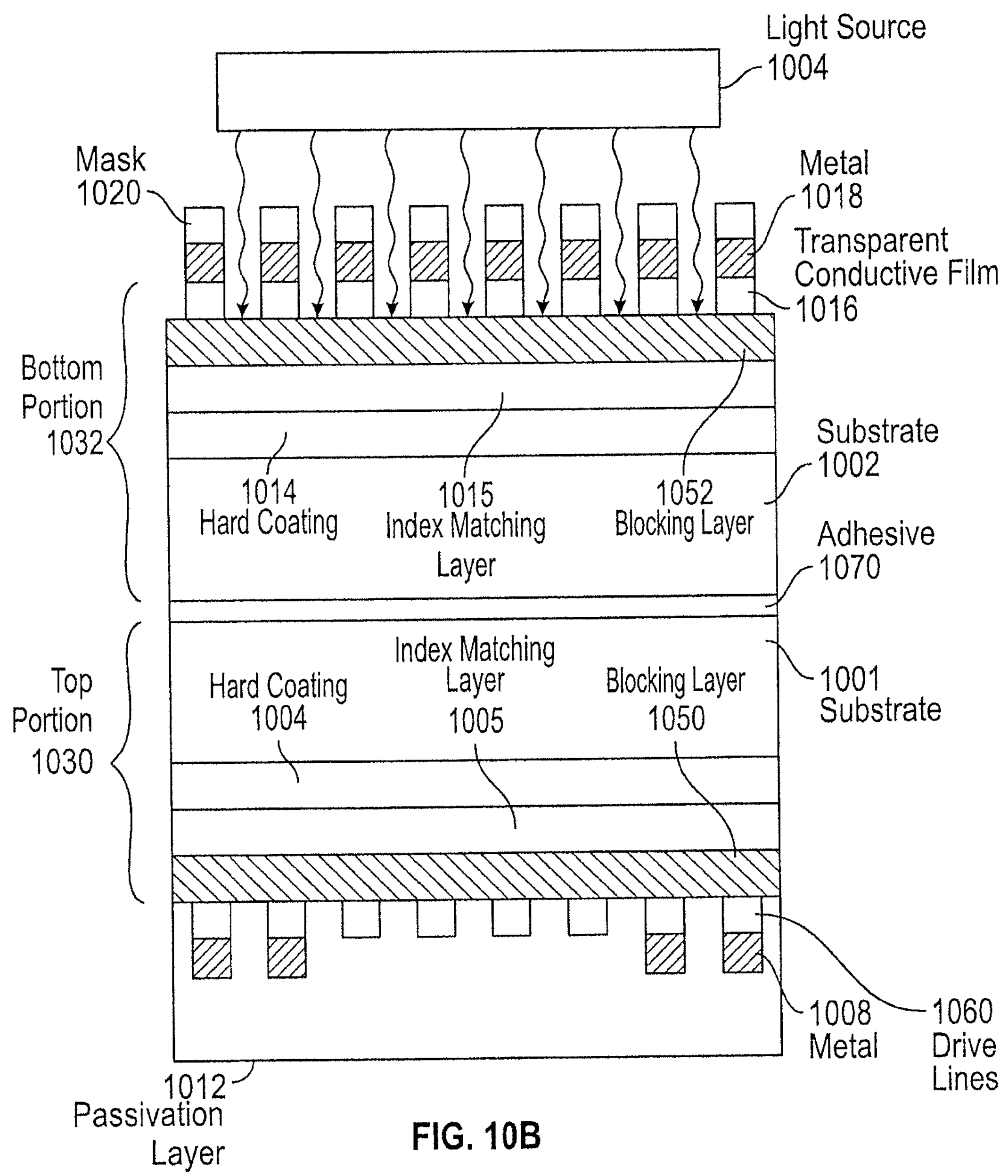
Figure 10C:
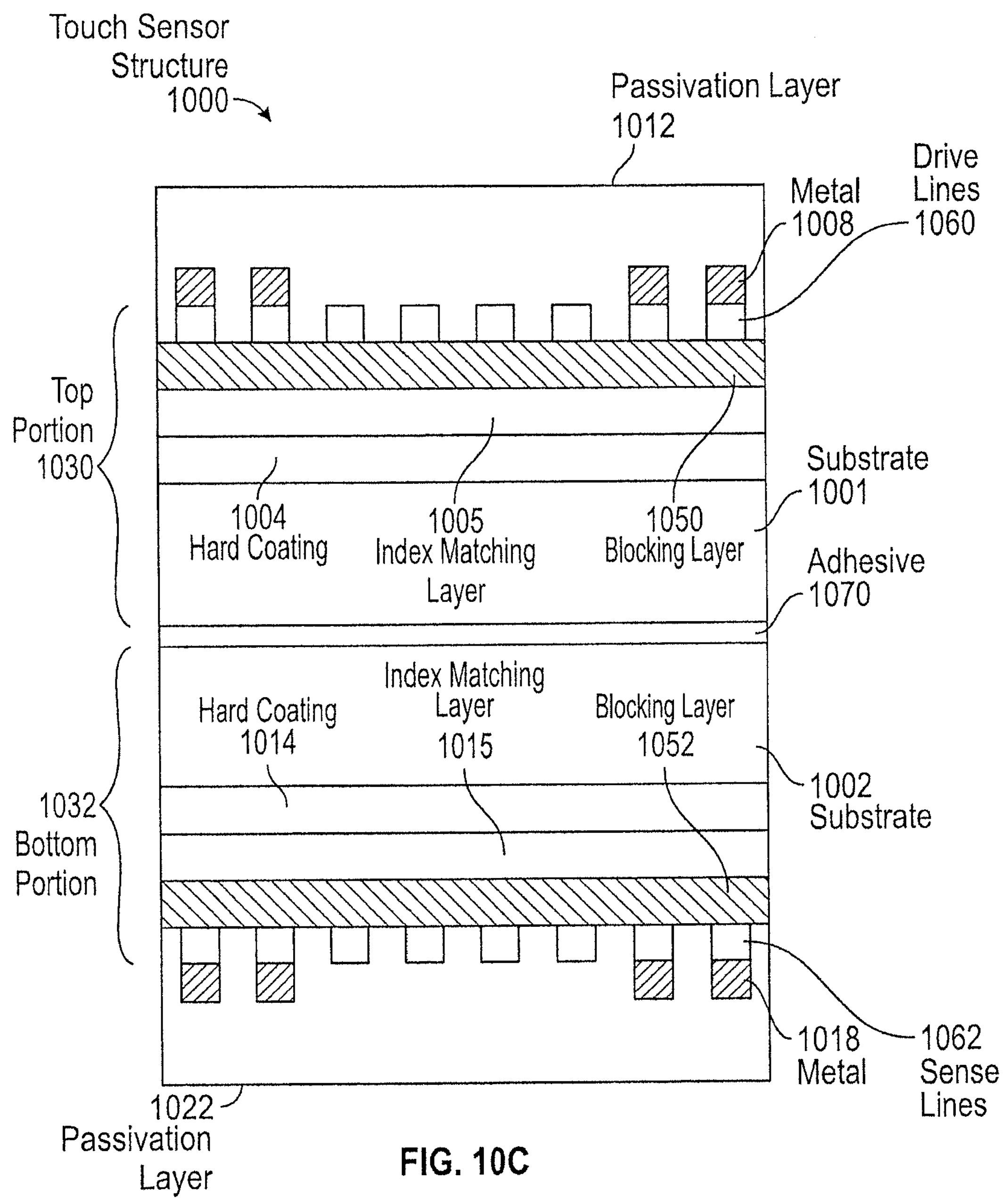

In addition to the SITO and DITO structures, one or more blocking layers can be included when the touch sensor structure is formed using other techniques, such as a two substrate lamination process. FIG. 9 illustrates an exemplary process 900 for manufacturing a touch sensor using a two substrate lamination process. Process 900 can be described below with reference to FIGS. 10A-10C. FIGS. 10A-10C illustrate cross-sectional views of an exemplary touch sensor structure 1000 stackup formed using a two substrate lamination process with blocking layers. The top portion 1030 and bottom portion 1032 can be formed on separate substrates 1001 and 1002, where the bottom portion 1032 can be formed following the top portion 1030. At step 901, two substrates can be provided. At step 903, the substrates can be bonded together using an adhesive 1070. At step 905, one or more underlying layers can be deposited, such as hard coating layer 1004 and index matching layer 1005. At step 907, blocking layer 1050 can be deposited, and at step 909, transparent conductive film 1006 can be disposed on the blocking layer 1050. At step 911, metal layer 1008 can be deposited. At step 913, mask 1010 can be deposited and top portion 1030 can be exposed to light source 1004. At step 915, metal layer 1008 and transparent conductive film 1006 can be ablated or etched using a source, such as a laser, to form drive lines 1060 and routing. At step 917, mask 1010 can be removed, and metal layer 1008 can be removed in the visible area of the touch sensor structure 1000, at step 919. At step 921, an optional passivation layer 1012 can be deposited. At step 932, the structure can be flipped, and the process can continue from steps 925-939 to form the underlying layers 1014-1015, blocking layer 1052, transparent conductive film 1016, metal layer 1018, and mask 1020 can be formed on the bottom portion 1032, as shown in FIG. 10B. At step 941, an optional passivation layer 1022 can be deposited, as shown in FIG. 10C.

Figure 10D:
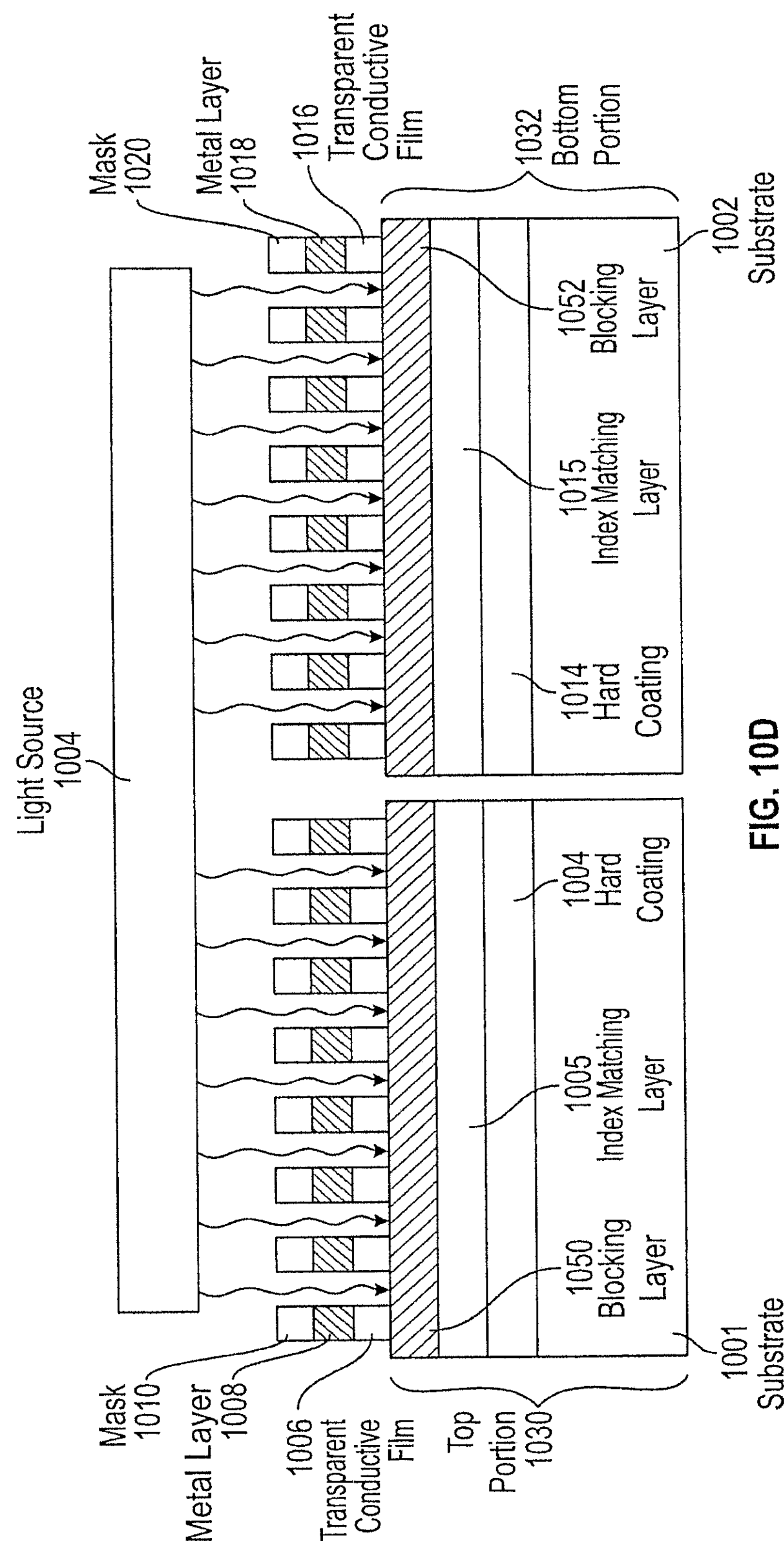

In some examples, top portion 1030 and bottom portion 1032 can be formed simultaneously or side-by-side, as exemplified in FIG. 10D. Blocking layers 1050 and 1052 can be used to block exposure or penetration of a light source, similar to the various examples of the disclosure discussed above. In some examples, the touch sensor structure 1000 can include both UV and IR blocking layers for processes that use both lithography and laser ablation, for example. Bonding of the top and bottom portions 1030 and 1032 together can be performed at any step of the process, such as the last step after the drive and sense lines have been formed, and is not limited to occurring before the portions are formed. Additionally, examples of the disclosure are not limited to the steps or the order of the steps shown in FIG. 9. In some examples, a blocking layer can be disposed between the substrates 1001 and 1002. In some examples, the adhesive 1070 can be multi-functional to include the capability of bonding the substrate while also serving as a blocking layer.

Figure 11:
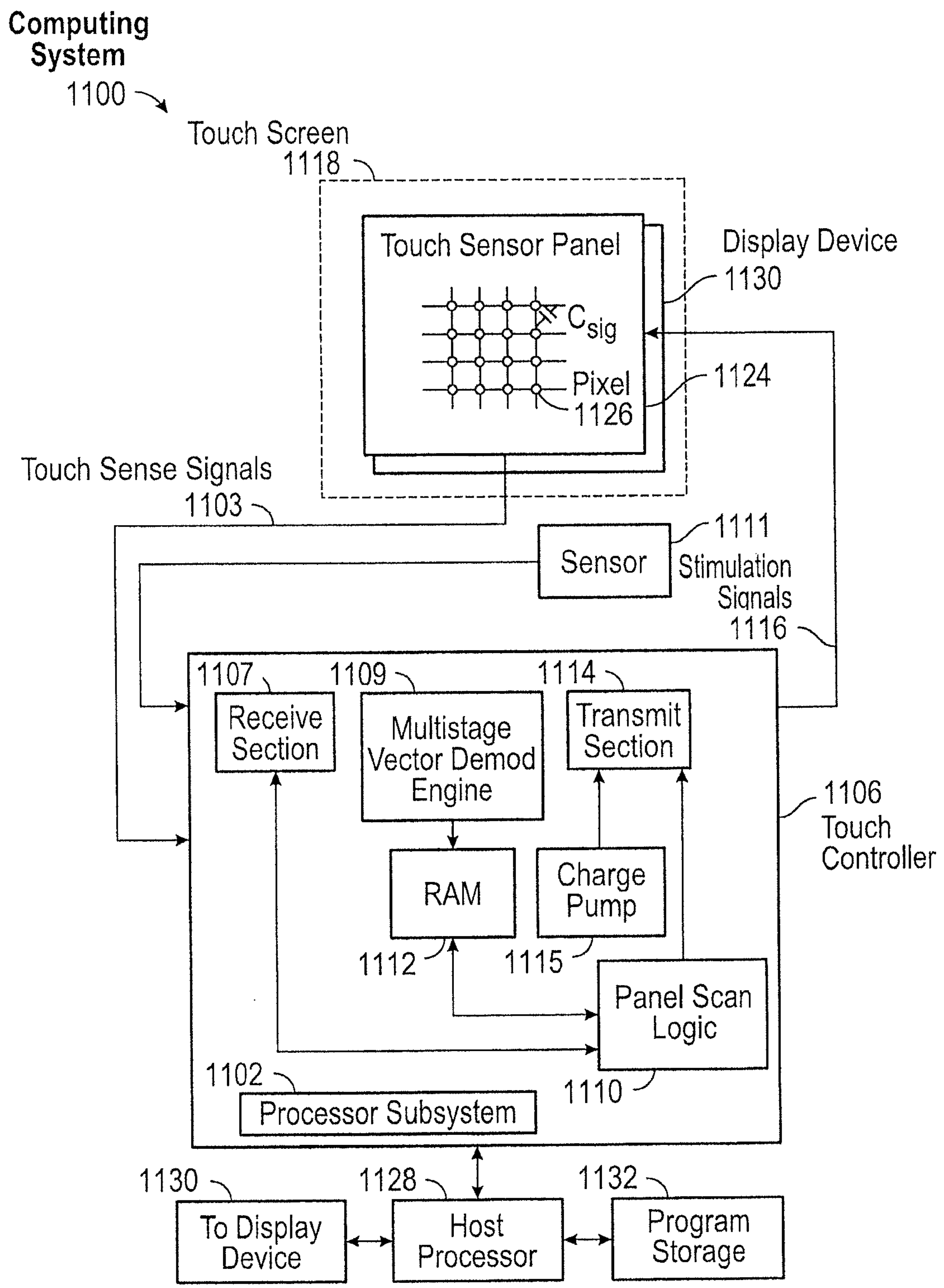
FIG. 11 illustrates an exemplary computing system that can include one or more examples of the disclosure.

FIG. 11 illustrates exemplary computing system 1100 that can utilize touch controller 1106 according to various examples of the disclosure. Touch controller 1106 can be a single application specific integrated circuit (ASIC) that can include one or more processor subsystems 1102, which can include, for example, one or more main processors, such as ARM968 processors or other processors with similar functionality and capabilities. However, in other examples, some of the processor functionality can be implemented instead by dedicated logic, such as a state machine. Processor subsystems 1102 can also include, for example, peripherals such as random access memory (RAM) 1112 or other types of memory or storage, watchdog timers (not shown), and the like. Touch controller 1106 can also include, for example, receive section 1107 for receiving signals, such as touch sense signals 1103, from the sense lines of touch sensor panel 1124, and other signals from other sensors such as sensor 1111, etc. Touch controller 1106 can also include, for example, a demodulation section such as multistage vector demod engine 1109, panel scan logic 1110, and a drive system including, for example, transmit section 1114. Panel scan logic 1110 can access RAM 1112, autonomously read data from the sense channels, and provide control for the sense channels. In addition, panel scan logic 1110 can control transmit section 1114 to generate stimulation signals 1116 at various frequencies and phases that can be selectively applied to the drive lines of the touch sensor panel 1124.

Charge pump 1115 can be used to generate the supply voltage for the transmit section. Stimulation signals 1116 (Vstim) can have amplitudes higher than the maximum voltage the ASIC process can tolerate by cascading transistors. Therefore, using charge pump 1115, the stimulus voltage can be higher (e.g. 6V) than the voltage level a single transistor can handle (e.g. 3.6 V). Although FIG. 11 shows charge pump 1115 separate from transmit section 1114, the charge pump can be part of the transmit section.

Touch sensor panel 1124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms “drive lines” and “sense lines” as used herein are intended to encompass not only orthogonal grids, but the intersecting traces or other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as pixel or node 1126, which can be particularly useful when touch sensor panel 1124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel.) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 1100 can also include host processor 1128 for receiving outputs from processor subsystems 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1128 can perform additional functions that may not be related to panel processing, and can be coupled to program storage 1132 and display device 1130 such as an LCD display for providing a UI to a user of the device. In some examples, host processor 1128 can be a separate component for touch controller 1106, as shown. In other examples, host processor 1128 can be included as part of touch controller 1106. In other examples, the functions of host processor 1128 can be performed by processor subsystem 1102 and/or distributed among other components of touch controller 1106. Display device 1130 together with touch sensor panel 1124, when located partially or entirely under the touch sensor panel, can form touch screen 1118.

Note that one or more of the functions described above can be performed, for example, by firmware stored in memory (e.g. one of the peripherals) and executed by processor subsystem 1102, or stored in program storage 1132 and executed by host processor 1128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figure 12A:
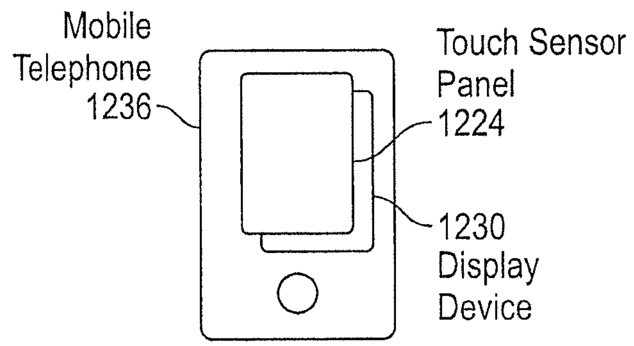
FIGS. 12A-12C illustrate an exemplary mobile telephone, media player, and personal computer that can include a touch sensor panel and display device according to various examples of the disclosure.
Figure 12B:
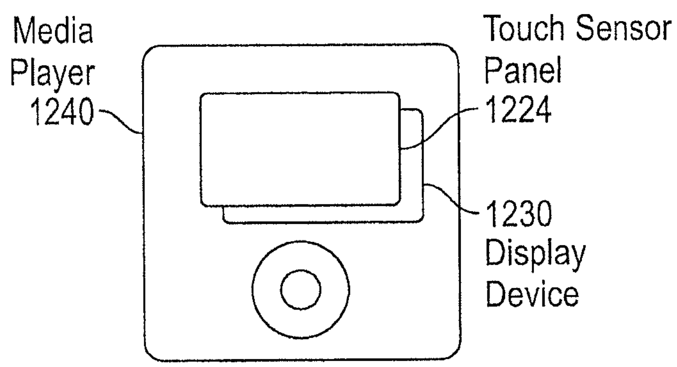
Figure 12C:
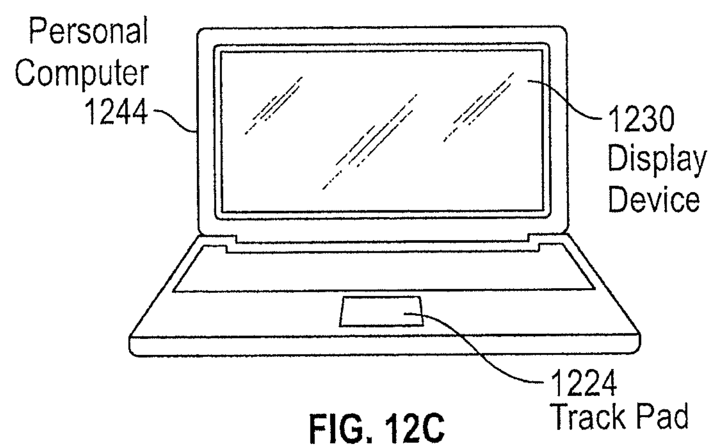

FIG. 12A illustrates exemplary mobile telephone 1236 that can include touch sensor panel 1224 and display device 1230. FIG. 12B illustrates exemplary media player 1240 that can include touch sensor panel 1224 and display device 1230. FIG. 12C illustrates an exemplary personal computer 1244 that can include touch sensor panel (trackpad) 1224 and display 1230. The touch sensor panels 1224 can include one or more blocking layers according to examples of the disclosure. In some examples, the display 1230 can be part of a touch screen.

In some examples, a touch sensor panel is disclosed. The touch sensor panel may comprise: a substrate; a plurality of first lines of a first conductive material; and one or more blocking layers disposed between the substrate and the plurality of first lines, wherein the one or more blocking layers are configured to block a light source. Additionally or alternatively to one or more examples disclosed above, in other examples the touch sensor panel, further comprises: a plurality of second lines of the first conductive material; and one or more second blocking layers disposed between the substrate and the plurality of second lines, wherein the one or more second blocking layers are configured to block a light source. Additionally or alternatively to one or more examples disclosed above, in other examples the touch sensor panel, further comprises: a second substrate, wherein the plurality of second lines is formed on the second substrate; and an adhesive layer configured for adhering the second substrate to the first substrate. Additionally or alternatively to one or more examples disclosed above, in other examples, the blocking layer is configured to block ultraviolet light. Additionally or alternatively to one or more examples disclosed above, in other examples the blocking layer is transparent to visible light. Additionally or alternatively to one or more examples disclosed above, in other examples the blocking layer is configured to block infrared light. Additionally or alternatively to one or more examples disclosed above, in other examples the blocking layer is configured to have an ablation fluence value greater than the fluence value of the light source. Additionally or alternatively to one or more examples disclosed above, in other examples the touch sensor panel further comprises: a second substrate, wherein the plurality of first lines are disposed on the substrate and the plurality of second lines are disposed on the second substrate. Additionally or alternatively to one or more examples disclosed above, in other examples the touch sensor panel further comprises: an adhesive configured for bonding the substrate to the second substrate. Additionally or alternatively to one or more examples disclosed above, in other examples the touch sensor panel further comprises: one or more underlying layers disposed between the substrate and at least one of the plurality of first lines and plurality of second lines, wherein the one or more underlying layers are multi-functional and configured to block a light source. Additionally or alternatively to one or more examples disclosed above, in other examples, the substrate is configured to block a light source. Additionally or alternatively to one or more examples disclosed above, in other examples a blocking layer in the visible area of the touch sensor panel is different from a blocking layer in the border area. Additionally or alternatively to one or more examples disclosed above, in other examples at least one of the blocking layers comprises multiple sublayers. Additionally or alternatively to one or more examples disclosed above, in other examples at least one of the blocking layers is a grating, a nanoparticle material composite, or a dye. Additionally or alternatively to one or more examples disclosed above, in other examples at least one of the blocking layers blocks ultraviolet light and at least one of the blocking layers blocks infrared light.

In some examples, a method for forming a touch sensor panel is disclosed. The method may comprise: providing a substrate; forming a plurality of first lines of a first conductive material; and forming one or more blocking layers disposed between the substrate and the plurality of first lines, wherein the one or more blocking layers are configured to block a light source. Additionally or alternatively to one or more examples disclosed above, in other examples the method further comprises: forming a plurality of second lines of the first conductive material; and forming one or more second blocking layers disposed between the substrate and the plurality of second lines, wherein the one or more second blocking layers are configured to block a light source. Additionally or alternatively to one or more examples disclosed above, in other examples the method further comprises: providing a second substrate; forming a plurality of second lines of the first conductive material on the second substrate; forming one or more second blocking layers disposed between the second substrate and the plurality of second lines, wherein the one or more second blocking layers are configured to block a light source; and adhering the second substrate to the first substrate. Additionally or alternatively to one or more examples disclosed above, in other examples the method further comprises: forming one or more underlying layers disposed between the substrate and at least one of the plurality of first lines and plurality of second lines, wherein the one or more underlying layers are multi-functional and configured to block a light source. Additionally or alternatively to one or more examples disclosed above, in other examples the one or more blocking layers are configured to block at least one of an ultraviolet light source or an infrared light source.

While various examples have been described above, it should be understood that they have been presented by way of example only, and not by way of limitation. Although examples have been fully described with reference to the accompanying drawings, the various diagrams may depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, and whether or not such features are presented as being part of a described example. Thus, the breadth and scope of the present disclosure should not be limited by any of the above-described examples.

What is claimed is:

1. A touch sensor panel comprising:
- a first substrate;
- a visible area that is transparent to allow light to transmit from a display through the visible area;
- a plurality of first lines of a first conductive material located in the visible area of the touch sensor and disposed on the first substrate;
- a border area located on at least one side of the visible area;
- a plurality of routing traces of a second conductive material located in the border area of the touch sensor panel and disposed on the first substrate and coupled to the plurality of first lines; and
- one or more blocking layers disposed between the first substrate and the plurality of first lines and located in the visible area and the border area of the touch sensor panel, wherein the one or more blocking layers are configured to block a light source.

2. The touch sensor panel of claim 1, further comprising:
- a plurality of second lines of the first conductive material; and
- one or more second blocking layers disposed between the first substrate or a second substrate and the plurality of second lines, wherein the one or more second blocking layers are configured to block another light source.

3. The touch sensor panel of claim 2, wherein the plurality of second lines is formed on the second substrate, the touch sensor panel further comprising:
- an adhesive layer configured for adhering the second substrate to the first substrate.

4. The touch sensor panel of claim 1, wherein the one or more blocking layers are configured to block ultraviolet light.

5. The touch sensor panel of claim 1, wherein the one or more blocking layers are transparent to visible light.

6. The touch sensor panel of claim 1, wherein the one or more blocking layers are configured to have an ablation fluence value greater than the fluence value of the light source.

7. The touch sensor panel of claim 1, further comprising:
- one or more underlying layers disposed between the first substrate and the plurality of first lines, wherein the one or more underlying layers are multi-functional and configured to block the light source.

8. The touch sensor panel of claim 1, wherein the first substrate is configured to block the light source.

9. The touch sensor panel of claim 1, wherein at least one of the one or more blocking layers comprises a first section and a second section, the first section located in the visible area of the touch sensor panel and the second section located in the border area of the touch sensor panel, wherein the second section is different from the first section.

10. The touch sensor panel of claim 1, wherein at least one of the one or more blocking layers comprises multiple sublayers.

11. The touch sensor panel of claim 1, wherein at least one of the one or more blocking layers includes one of a grating, nanoparticle material composite, and dye.

12. The touch sensor panel of claim 1, wherein at least one of the one or more blocking layers blocks ultraviolet light and at least one of the one or more blocking layers blocks infrared light.

13. A method for forming a touch sensor panel, the method comprising:

providing a first substrate;

forming a plurality of first lines of a first conductive material on the first substrate and locating the plurality of first lines in a visible area of the touch sensor panel, wherein the visible area is transparent to allow light to transmit from a display through the visible area;

forming a plurality of routing traces of a second conductive material on the first substrate and locating the plurality of routing traces in a border area of the touch sensor panel; and forming one or more blocking layers disposed between the first substrate and the plurality of first lines and locating the one or more blocking layers in the visible area and the border area of the touch sensor panel, wherein the one or more blocking layers are configured to block a light source.

14. The method of claim 13, further comprising:

providing a second substrate;

forming a plurality of second lines of the first conductive material on the second substrate;

forming one or more second blocking layers disposed between the second substrate and the plurality of second lines, wherein the one or more second blocking layers are configured to block another light source; and adhering the second substrate to the first substrate.

15. The method of claim 13, further comprising:

forming one or more underlying layers disposed between the first substrate and the plurality of first lines, wherein the one or more underlying layers are multi-functional and configured to block the light source.

16. The method of claim 13, wherein the one or more blocking layers are configured to block at least one of an ultraviolet light source or an infrared light source.

17. The method of claim 13, further comprising:

depositing a third material on the first substrate;

patterning the third material with a pattern; and exposing the touch sensor panel with the light source to transfer the pattern from the third material to the first conductive material.

18. The touch sensor panel of claim 6, wherein the one or more blocking layers have a fluence value between 60-100 $mJ/cm^2$.

19. The touch sensor panel of claim 10, wherein the multiple sublayers includes $TiO_2$ and $MgF_2$.

20. The touch sensor panel of claim 1, wherein at least one of the one or more blocks layers contacts the first conductive material.

* * * * *